(12) United States Patent
Miyasaka et al.

(10) Patent No.: US 11,740,426 B2
(45) Date of Patent: Aug. 29, 2023

(54) OPTICAL ELEMENT, OPTICAL SYSTEM AND OPTICAL DEVICE

(71) Applicant: AGC Inc., Tokyo (JP)

(72) Inventors: Koji Miyasaka, Tokyo (JP); Jin Uemura, Tokyo (JP); Gousuke Yoshida, Shizuoka (JP); Kosuke Takayama, Fukushima (JP)

(73) Assignee: AGC Inc., Tokyo (JP)

( * ) Notice: Subject to any disclaimer, the term of this patent is extended or adjusted under 35 U.S.C. 154(b) by 15 days.

(21) Appl. No.: 17/167,264

(22) Filed: Feb. 4, 2021

(65) Prior Publication Data

US 2021/0157088 A1    May 27, 2021

Related U.S. Application Data

(63) Continuation of application No. PCT/JP2019/031838, filed on Aug. 13, 2019.

(30) Foreign Application Priority Data

Aug. 17, 2018  (JP) .................................. 2018-153404

(51) Int. Cl.
G02B 7/02        (2021.01)
G02B 3/00        (2006.01)

(52) U.S. Cl.
CPC ................ G02B 7/028 (2013.01); G02B 3/00 (2013.01)

(58) Field of Classification Search
CPC ......... G02B 7/028; G02B 3/00; G02B 3/0031
See application file for complete search history.

(56) References Cited

U.S. PATENT DOCUMENTS

| | | | |
|---|---|---|---|
| 4,793,703 A | 12/1988 | Fretz, Jr. | |
| 5,064,712 A | 11/1991 | Fretz, Jr. | |
| 2005/0044115 A1* | 2/2005 | Iwakawa | B32B 27/08 |
| | | | 708/200 |
| 2005/0018001 A1 | 8/2005 | Mukaiyama et al. | |
| 2011/0211261 A1 | 9/2011 | Fukuta | |
| 2012/0268829 A1 | 10/2012 | Fukuta | |
| 2015/0331154 A1* | 11/2015 | Matsushima | G02B 3/0031 |
| | | | 428/172 |

FOREIGN PATENT DOCUMENTS

| | | |
|---|---|---|
| JP | 64-50013 A | 2/1989 |
| JP | 2-282701 A | 11/1990 |
| JP | 2005-234038 A | 9/2005 |
| JP | 2008-250285 A | 10/2008 |

(Continued)

OTHER PUBLICATIONS

International Search Report dated Oct. 15, 2019 in PCT/JP2019/031838 filed Aug. 13, 2019, 2 pages.

(Continued)

*Primary Examiner* — Alicia M Harrington
(74) *Attorney, Agent, or Firm* — Oblon, McClelland, Maier & Neustadt, L.L.P.

(57) ABSTRACT

An optical element includes: a glass substrate; an optical function portion made of a resin; and a bonding portion that bonds the glass substrate and the optical function portion to each other. The bonding portion has a glass transition point of 85° C. or lower. The glass transition point of the bonding portion may be 50° C. or lower.

20 Claims, 5 Drawing Sheets

(56) References Cited

FOREIGN PATENT DOCUMENTS

JP        2014-202904 A    10/2014
WO    WO 2010/050304 A1    5/2010

OTHER PUBLICATIONS

Yamashina, N. "Special-5: Mechanism of Warpage of Copper-Clad Laminate," Proceedings of Symposium, Synthetic Resin Industry Association, 1985, vol. 35, 4 pages.
Yasmin, A. et al. "Mechanical and thermal properties of graphite platelet/epoxy composites," Polymer, vol. 45, 2004, 9 pages.

* cited by examiner

OPTICAL ELEMENT, OPTICAL SYSTEM AND OPTICAL DEVICE

CROSS-REFERENCE TO RELATED APPLICATIONS

This application is a continuation of International Application No. PCT/JP2019/031838 filed on Aug. 13, 2019, and claims priority to Japanese Application No. 2018-153404 filed on Aug. 17, 2018, the disclosures of all of which are incorporated herein by reference in their entireties.

TECHNICAL FIELD

The present invention relates to an optical element using a glass substrate and a resin, an optical system including the optical element, and an optical device including the optical element.

BACKGROUND ART

In a common technique of a wafer lens, an ultraviolet curing resin or a thermosetting resin is formed on a glass substrate by an imprint method, thereby forming a lens on the glass substrate (for example, see Patent Literature 1). The wafer lens contributes to compactification of a lens system.

Patent Literature 2 describes an optical system in which a lens (condensing lens) and an optical filter have been integrated. In the case where the wafer lens is used in such an optical system, the thickness of the optical system can be reduced. Thus, the wafer lens contributes to compactification of the optical system.

CITATION LIST

Patent Literature

Patent Literature 1: WO 2010/050304
Patent Literature 2: JP-A-2005-234038
Patent Literature 3: JP-A-2008-250285

Non-Patent Literature

Non-Patent Literature 1: Naotoshi Yamashina, "Special-5: Mechanism of Warpage of Copper-Clad Laminate", Proceedings of Symposium, Synthetic Resin Industry Association, 1985, Vol. 35, p. 125-128

SUMMARY OF INVENTION

Technical Problem

In the case where a laminate of a glass substrate and a lens made of a resin is manufactured, warpage occurs in accordance with a change in temperature due to a difference between the linear thermal expansion coefficient of the glass and the linear thermal expansion coefficient of the resin. The warpage degrades the optical characteristics of the lens system. Particularly in the case where the resin is present only on one side of the glass substrate, the warpage becomes conspicuous. In addition, in the case where the glass substrate is thin and the resin is thick, the warpage is especially conspicuous.

Patent Literature 3 describes a laminate in which a lens made of a resin and an optical filter (specifically an infrared filter) made of a glass have been stacked on each other. If the optical filter is pasted all over a surface of the lens in order to stack the lens and the optical filter on each other, the optical filter is more likely to peel off due to a difference between the volume expansion ratio of the resin and the volume expansion ratio of the glass. Therefore, in the laminate described in Patent Literature 3, the lens and the optical filter are bonded to each other outside effective regions of the lens and the optical filter in order to inhibit the optical filter from peeling off.

However, even if the bonding portion is limited within a partial region, warpage or deflection may occur in accordance with a change in temperature because the glass and the resin are bound by the bonding.

An object of an aspect of the present invention is to provide an optical element using a glass substrate and a resin and capable of reducing warpage caused by a change in temperature, an optical system including the optical element, and an optical device including the optical element.

Solution to Problem

An optical element according to one aspect of the present invention includes: a glass substrate; an optical function portion made of a resin; and a bonding portion that bonds the glass substrate and the optical function portion to each other, in which the bonding portion has a glass transition point of 85° C. or lower.

An optical element according to another aspect of the present invention includes: a glass substrate; an optical function portion made of a resin; and a bonding portion that bonds the glass substrate and the optical function portion to each other, in which the bonding portion has a Young's modulus of less than 100 MPa.

An optical system according to one aspect of the present invention includes the optical element according to the aforementioned aspects.

An optical device according to one aspect of the present invention includes the optical element according to the aforementioned aspects.

Advantageous Effects of Invention

In an aspect of the present invention, warpage caused by a change in temperature is reduced in an optical element using a glass substrate and a resin.

DESCRIPTION OF EMBODIMENTS

Aspects of the present invention will be described below in detail. The present invention is not limited to the aspects described below.

Optical Element

An optical element according to an aspect of the present invention includes a glass substrate, an optical function portion, and a bonding portion for bonding the glass substrate and the optical function portion with each other. The optical element will be described below with reference to the drawings.

Figure 1:
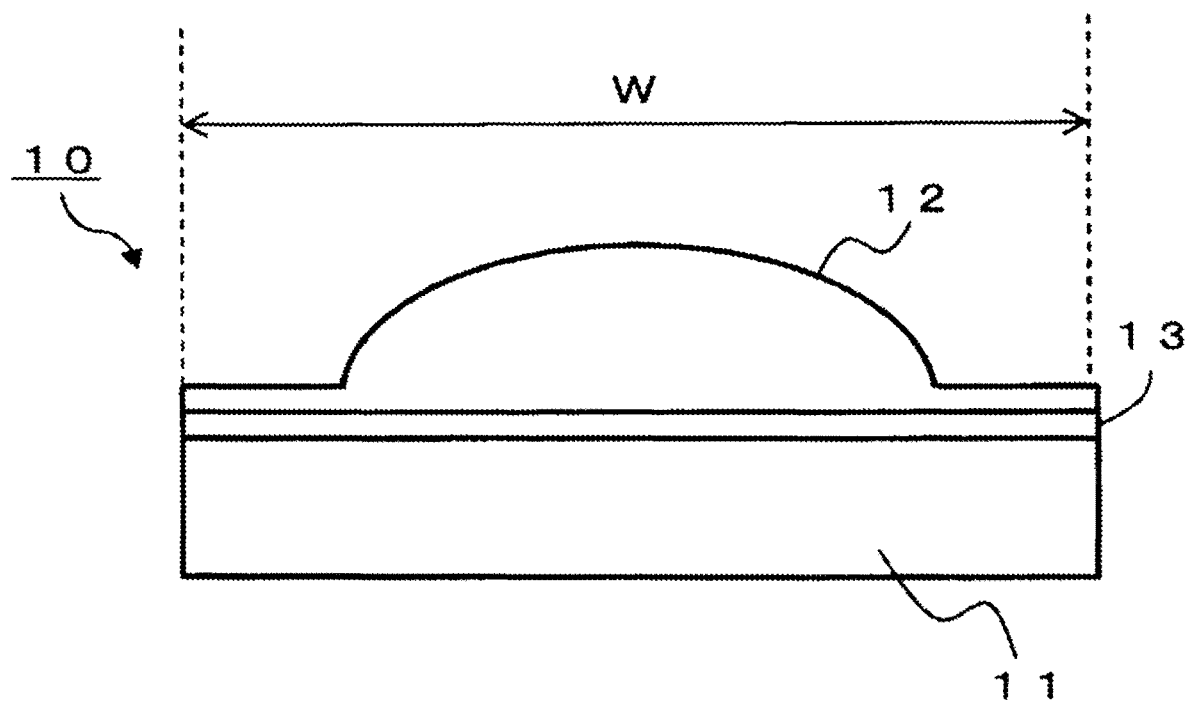
FIG. 1 is a sectional view showing an example of an embodiment of an optical element.

FIG. 1 is a sectional view showing an embodiment of the optical element. An optical element 10 according to the present embodiment is constituted by a glass substrate 11, an optical function portion 12 made of a resin, and a bonding portion (bonding layer) 13 including, for example, an adhesive agent or an OCA (Optical Clear Adhesive) double-sided tape.

The optical function portion 12 has a shape having an optical function such as a lens shape at least partially. The optical function portion 12 and the glass substrate 11 are bonded to each other via the bonding portion 13. A coating such as an antireflection film may be provided in a surface of the optical function portion 12 or an interface between the optical function portion 12 and the bonding portion 13. Incidentally, W designates the width of the bonding portion 13.

The shape of the glass substrate 11 is not limited, but it is, for example, a flat plate. In plan view, the shape of the glass substrate 11 may be rectangular, circular or elliptic. The glass substrate 11 may be transparent in at least a part of an operating wavelength band in an optical system. In addition, the glass substrate 11 may have an antireflection layer in an interface between the glass substrate 11 and the air or an interface between the glass substrate 11 and the bonding portion 13.

In addition, the glass substrate 11 may have an optical filter function. An optical function layer having a reflection function or an absorption function with respect to any one or two or more of infrared rays, visible rays and ultraviolet rays may be deposited on the glass substrate 11 in order to impart an optical filter function thereto. An optical multilayer film containing a metal, a semiconductor, a dielectric, etc. or an organic film containing an organic dye, a pigment, etc. may be used as the optical function layer. In addition, a material having a reflection function or an absorption function with respect to any one or two or more of infrared rays, visible rays and ultraviolet rays may be used as a glass material used for the glass substrate 11 in place of the optical function layer deposited on the glass substrate 11.

Figure 2A:
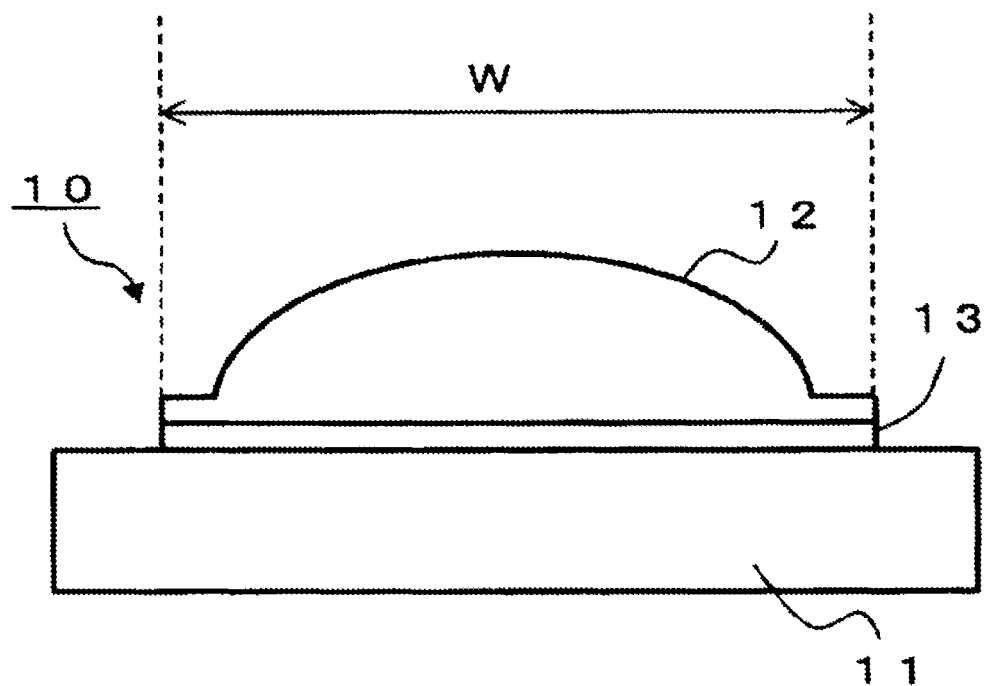
FIG. 2A and FIG. 2B are sectional views showing examples of another embodiment of an optical element.
Figure 2B:
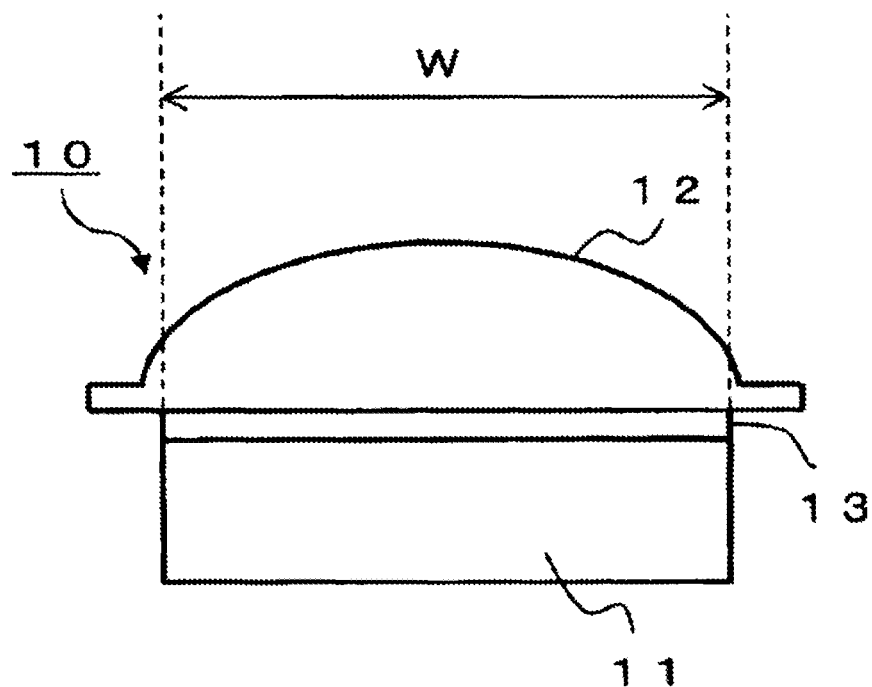
Figure 3A:
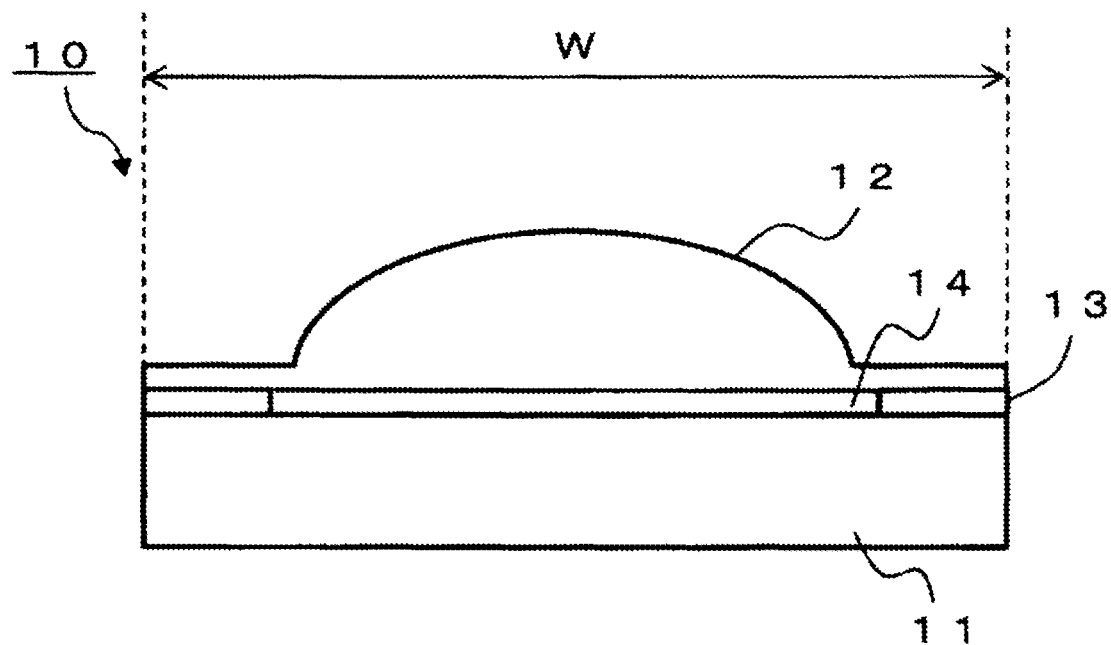
FIG. 3A and FIG. 3B are sectional views showing examples of another embodiment of an optical element.

The shape of the optical element 10 is not limited to the shape illustrated in FIG. 1. For example, the glass substrate 11 may have a larger width than the optical function portion 12, as illustrated in FIG. 2A. Alternatively, the glass substrate 11 may have a smaller width than the optical function portion 12 as illustrated in FIG. 2B. Further, as shown in FIG. 3A, the bonding portion 13 may be provided on the outer circumferential portion of the optical function portion 12. In this case, a space 14 between the glass substrate 11 and the optical function portion 12 is an air layer.

Figure 3B:
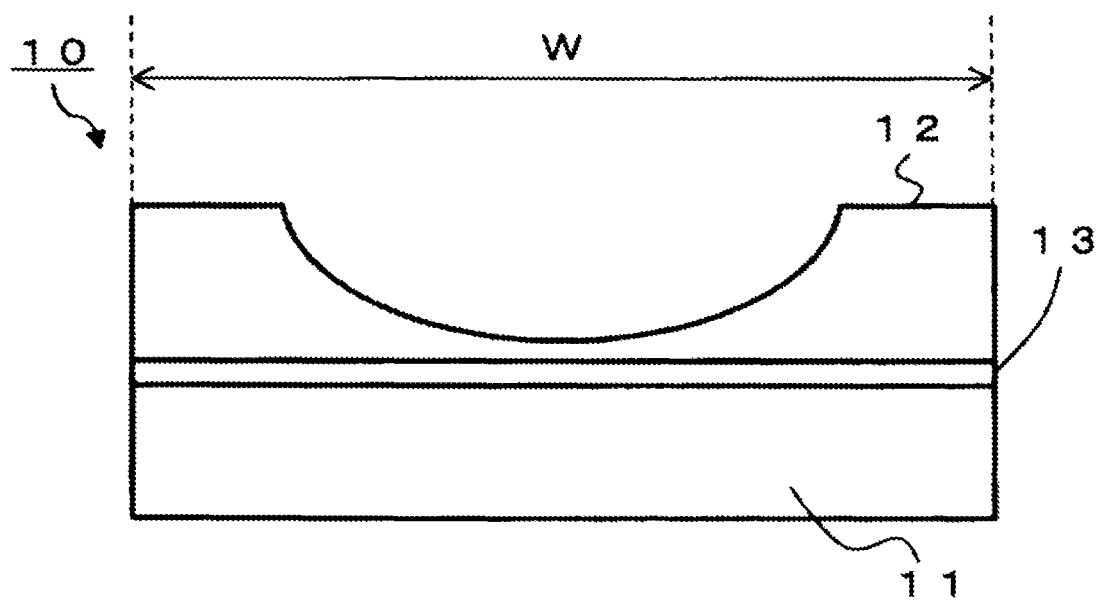

In addition, the surface shape of the optical function portion 12 is not limited to the convex shape. For example, the optical function portion 12 may have a concave shape as illustrated in FIG. 3B. Alternatively, the optical function portion 12 may have a substantially flat shape with very small irregularities like a diffraction grating.

By way of example, the optical element 10 is manufactured in such a manner that the optical function portion 12 formed in advance is bonded to the glass substrate 11 via the bonding portion 13. For another example, the optical function portion 12 may be shaped by an imprint method on the bonding portion 13 which has been provided on the glass substrate 11.

Next, consideration will be made about the warpage of the optical element 10 caused by a change in temperature. Here, the consideration will be made using a general formula about the warpage of a laminate of k layers described in Non-Patent Literature 1.

In the following formula (1), $E_k$ designates an elastic modulus of each layer, $\alpha_k$ designates a linear thermal expansion coefficient of each layer, $Z_k$ designates a position of each interface among the layers in their thickness direction from reference coordinates which can be set at a desired position, t designates a temperature difference from a reference temperature, and K designates a curvature of deformation in the laminate caused by the temperature difference t.

$$K=(A\times F-B\times D)/(A\times C-B^2)$$

$$A=\Sigma\{E_k\times(Z_k-Z_{k-1})\}$$

$$B=(1/2)\times\Sigma\{E_k\times(Z_k^2-Z_{k-1}^2)\}$$

$$C=(1/3)\times\Sigma\{E_k\times(Z_k^3-Z_{k-1}^3)\}$$

$$D=t\times\Sigma\{E_k\times\alpha_k\times(Z_k-Z_{k-1})\}$$

$$F=(t/2)\times\Sigma\{E_k\times\alpha_k\times(Z_k^2-Z_{k-1}^2)\} \quad (1)$$

When the displacement (warpage) in the thickness direction caused by the arc with the curvature K is $\Delta H$, $\Delta H$ can be defined as the following formula (2). W designates the width of the bonding portion.

$$\Delta H=(1/|K|)-\sqrt{\{(1/K)^2-(W/2)^2\}} \quad (2)$$

Accordingly, the warpage of the laminate caused by the change in temperature can be provisionally calculated using formula (1) and formula (2). The unit of $E_k$ is [MPa]. The unit of $Z_k$ is [mm]. The unit of $\alpha_k$ is [/° C.]. The unit of $\Delta H$ is [mm]. The unit of t is [° C.].

The aforementioned formula (1) is a formula assuming a model in which flat sheets have been stacked. However, in the case where the surface thickness varies depending on a place as in a lens, calculation may be made using the thickness of a part which is the highest from the bonding portion 13. In the case where the bonding portion 13 is sufficiently thin (for example, in the case where the thickness of the bonding portion 13 is equal to or less than 1/5 of the thickness of the optical function portion 12), calculation may be made on the two layers serving as the glass substrate 11 and the optical function portion 12. In this case, K is derived by the following formula (3).

$$K=(A\times F-B\times D)/(A\times C-B^2)$$

$$A=Es\times Hs+Em\times Hm$$

$$B=(1/2)\times[Es\times Hs^2+Em\times\{(Hs+Hm)^2-Hs^2\}]$$

$$C=(1/3)\times[Es\times Hs^3+Em\times\{(Hs+Hm)^3-Hs^3\}]$$

$$D=\Delta T\times\{Es\times\alpha s\times Hs+Em\times\alpha m\times Hm\}$$

$$F=(\Delta T/2)\times[Es\times\Delta s\times Hs^2+Em\times\alpha m\times\{(Hs+Hm)^2-Hs^2\}] \quad (3)$$

In the aforementioned formula (3), Hm designates the thickness (in [mm]) of the thickest part of the optical function portion 12, Em designates the Young's modulus (in [MPa]) of the optical function portion 12, αm designates the linear thermal expansion coefficient (in [/° C.]) of the optical function portion 12, Hs designates the thickness (in [mm]) of the glass substrate 11, Es designates the Young's modulus (in [MPa]) of the glass substrate 11, αs designates the linear thermal expansion coefficient (in [/° C.]) of the glass substrate 11, and ΔT designates the difference (in [° C.]) between a room temperature and a temperature serving as the upper limit of the temperature range where the optical element 10 should function. Various ranges can be supposed as the temperature range where the optical element 10 should function. The following description will be made for the case of ΔT=25° C. by way of example.

In the case of ΔT=25° C., ΔH is preferably 0.005 mm or more, and ΔH is preferably 0.01 mm or more. In the optical element according to an aspect of the present invention, warpage can be reduced in spite of ΔH in the aforementioned range in the case where the glass transition point or the Young's modulus of the bonding portion is set within a specified range as will be described later.

The thickness of the optical function portion 12, the thickness of the glass substrate 11, the thickness of the bonding portion 13, and the width W of the bonding portion 13 can be measured by sectional observation with an electron microscope (SEM) or by use of an optical microscope.

The Young's modulus can be measured by a tensile test, a compression test, a torsion test, a resonance method, an ultrasonic pulse method, a pendulum method, etc. The measuring method is, for example, described in the following standards.

JIS R1602: 1995 "Testing Methods for Elastic Modulus of Fine Ceramics"

JIS R1605: 1995 "Testing Methods for Elastic Modulus of Fine Ceramics at Elevated Temperature"

JIS Z2201: 1998 "Test Pieces for Tensile Test for Metallic Materials"

JIS Z2241: 2011 "Method of Tensile Test for Metallic Materials"

JIS G0567J: 2012 "Method of Elevated Temperature Tensile Test for Steels and Heat-Resisting Alloys"

JIS Z2280: 1993 "Test Method for Young's Modulus of Metallic Materials at Elevated Temperature"

In addition, in the case where the optical function portion, the glass substrate and the bonding portion are thin in thickness, it may be difficult to measure the Young's modulus in the aforementioned method. In such a case, a nanoindenter method may be used. A measuring method using the nanoindenter method is, for example, described in ISO 14577.

The linear thermal expansion coefficient can be measured by use of a thermomechanical analyzer (TMA). Alternatively, methods according to the following JIS standards may be used to measure the linear thermal expansion coefficient.

JIS Z2285: 2003 Measuring Method of Coefficient of Linear Thermal Expansion of Metallic Materials JIS R1618: 2002 Measuring Method of Thermal Expansion of Fine Ceramics by Thermomechanical Analysis JIS R3251: 1995 Measuring Method of the Linear Thermal Expansion Coefficient for Low Expansion Glass by Laser Interferometry JIS R3102: 1995 Testing Method for Average Linear Thermal Expansion of Glass Each of the Young's moduli or the linear thermal expansion coefficients of the optical function portion, the glass substrate and the bonding portion may be measured in a state where they are bonded or in a state where they are not bonded. In addition, the optical function portion, the glass substrate and the bonding portion may be measured in different measuring methods respectively. The value of the Young's modulus or the linear thermal expansion coefficient may have a variation depending on processes each material undergoes. In such a case, a material having a chemical composition close to an actual material of each member may be formed to measure the Young's modulus or the linear thermal expansion coefficient thereof and use the measured value as the Young's modulus or the linear thermal expansion coefficient of the member. Further, the Young's modulus or the linear thermal expansion coefficient may be measured by use of another method than the aforementioned methods.

TABLE 1

|    | Example 1 | Example 2 | Example 3 | Example 4 | Example 5 |
|----|-----------|-----------|-----------|-----------|-----------|
| Hs | 0.1 | 0.1 | 0.1 | 0.2 | 0.2 |
| Hm | 0.1 | 0.2 | 0.3 | 0.1 | 0.2 |
| Es | 80000 | 80000 | 80000 | 80000 | 80000 |
| Em | 2000 | 2000 | 2000 | 2000 | 2000 |
| αs | 0.000013 | 0.000013 | 0.000013 | 0.000013 | 0.000013 |
| αm | 0.0001 | 0.0001 | 0.0001 | 0.0001 | 0.0001 |
| W  | 5 | 5 | 5 | 5 | 5 |
| ΔH | 0.015 | 0.023 | 0.023 | 0.003 | 0.008 |

|    | Example 6 | Example 7 | Example 8 | Example 9 |
|----|-----------|-----------|-----------|-----------|
| Hs | 0.2 | 0.3 | 0.3 | 0.3 |
| Hm | 0.3 | 0.1 | 0.2 | 0.3 |
| Es | 80000 | 80000 | 80000 | 80000 |
| Em | 2000 | 2000 | 2000 | 2000 |
| αs | 0.000013 | 0.000013 | 0.000013 | 0.000013 |
| αm | 0.0001 | 0.0001 | 0.0001 | 0.0001 |
| W  | 5 | 5 | 5 | 5 |
| ΔH | 0.010 | 0.001 | 0.003 | 0.005 |

Table 1 shows a result of each ΔH in the case of ΔT=25° C. calculated by use of formula (2) and formula (3) when the Young's modulus Es of the glass substrate 11 was set at 80,000 MPa, the linear thermal expansion coefficient αs of the glass substrate 11 was set at $1.3 \times 10^{-5}$/° C., the Young's modulus Em of the optical function portion 12 was set at 2,000 MPa, the linear thermal expansion coefficient αm of the optical function portion 12 was set at $1 \times 10^{-5}$/° C., ΔH and the width W of the bonding portion 13 was set at 5 mm. As is understood from Table 1, ΔH caused by a change in temperature increases in the case where the thickness Hs of the glass substrate 11 is thin or the case where the thickness Hm of the optical function portion 12 is thin.

For example, in the case where the optical function portion 12 has a lens shape, the focal length of the lens surface changes depending on a change in temperature. In the case where the optical element 10 is incorporated in an optical system, such a change in focal length causes an aberration in the optical system. In the case where the optical system is an imaging system, the aberration exerts a bad influence such as an imaging blur. The amount of acceptable aberration depends on the optical system. For example, the amount of warpage occurring in the optical element 10 due to a change in temperature is preferably 0.010 mm or less, and more preferably 0.005 mm or less.

In addition, since the optical element 10 is typically bonded into a package such as a lens barrel, the temperature dependency of the warpage belonging to the optical element 10 itself may be reduced by the restriction to the package. In such a case, the amount of warpage occurring in the optical element 10 itself due to a change in temperature is, for example, preferably 0.020 mm or less.

The aforementioned consideration was made using formulas (1) to (3). Formulas (1) to (3) assume that the laminate has been bonded and deformed uniformly. However, as a result of investigation of the present inventor et al., as will be described later, it has been found that there is an effect of reducing warpage caused by a change in temperature in the case where the Young's modulus of the bonding portion 13 is sufficiently small. Accordingly, in the optical element according to an aspect of the present invention, the Young's modulus of the bonding portion is set to be not higher than a specified value which will be described later.

Figure 4A:
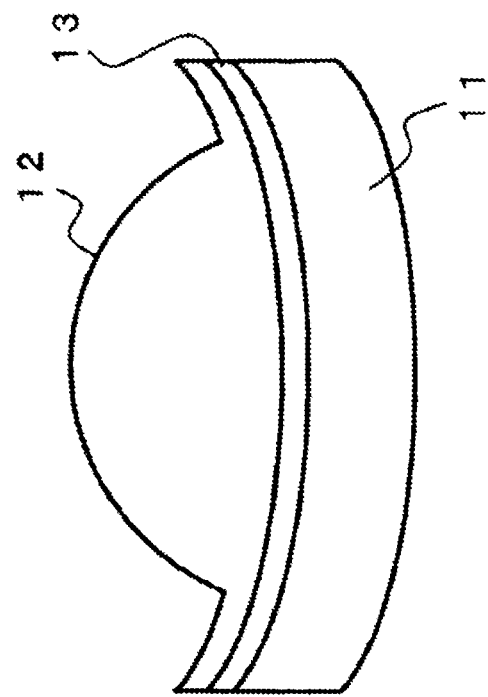
FIG. 4A and FIG. 4B are views for illustrating reduction in warpage of an optical element.
Figure 4B:
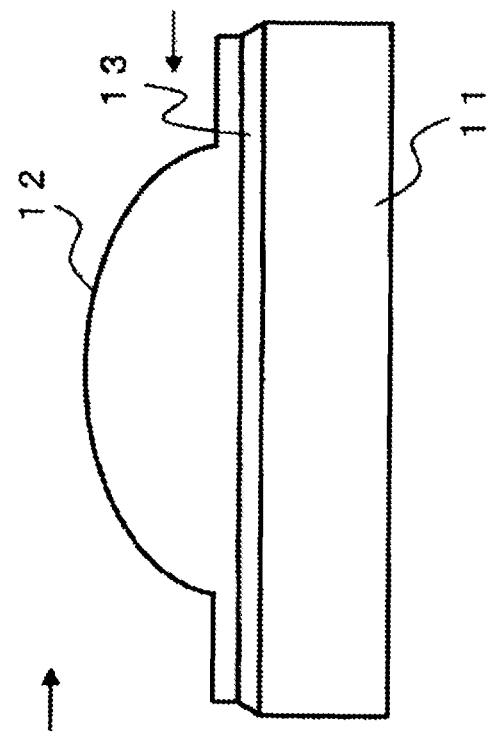

FIG. 4A and FIG. 4B are explanatory views for explaining reduction in warpage of the optical element 10. In the optical element 10 shown in FIG. 4A, the Young's modulus of the bonding portion 13 is sufficiently small. In the case where the Young's modulus of the bonding portion 13 is sufficiently small as shown in FIG. 4A, it can be considered that the warpage of the optical element 10 is reduced by deformation of the bonding portion 13 in accordance with contraction of the optical function portion 12.

On the other hand, in the case where the Young's modulus of the bonding portion 13 is high, the bonding portion 13 cannot be deformed sufficiently in accordance with the contraction of the optical function portion 12 so that the optical element 10 warps as a whole, as shown in FIG. 4B.

The warpage in consideration of such deformation can be calculated by a finite element method.

Figure 5:
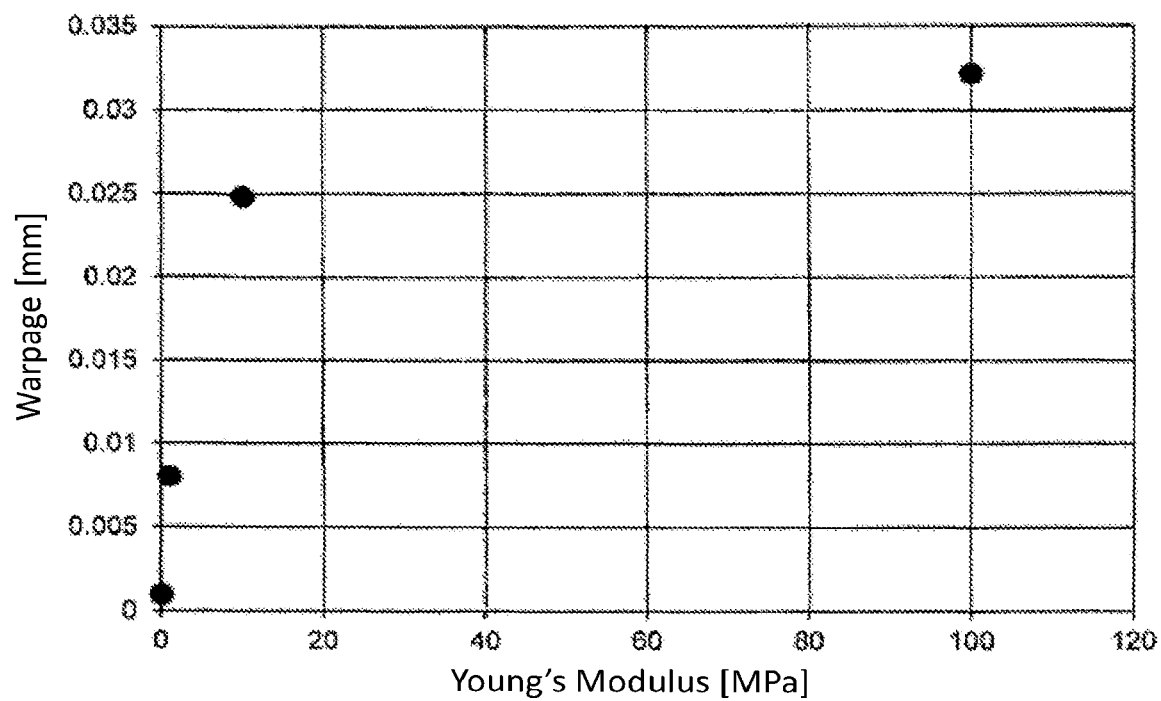
FIG. 5 is a graph showing a result of an amount of warpage calculated by a finite element method when a temperature difference between a temperature at which an optical element functions and a room temperature is 25° C.

FIG. 5 is a graph showing a result of the amount of warpage calculated by the finite element method for the case where the difference between the temperature in which the optical element 10 functions and the room temperature is 25° C. The calculation was made on the assumption that the shape of the bonding portion 13 was rectangular in plan view, and the diagonal length W (width) was 9 mm. In addition, the thickness of the glass substrate 11 was set at 0.2 mm, the thickness of the bonding portion 13 was set at 0.01 mm, and the thickness of the optical function portion 12 was set at 0.5 mm. In addition, the optical function portion 12 was set as a concave lens.

A calculation method using the finite element method is described in Jacob Fish "A first course in finite elements" released on Dec. 20, 2008, Maruzen, or the like. For the calculation, general-purpose finite element method calculation software (such as Abaqus, ANSYS, Solidworks Simulation, etc.) can be used.

The Young's modulus of the glass substrate 11 was set at 80,000 MPa, the linear thermal expansion coefficient of the glass substrate 11 was set at $1.3 \times 10^{-5}/°$ C. the Young's modulus of the optical function portion 12 was set at 2,000 MPa, and the linear thermal expansion coefficient of the optical function portion 12 was set at $1 \times 10^{-4}/°$ C. On this occasion, the linear thermal expansion coefficient of the bonding portion 13 was set at $1 \times 10^{-4}/°$ C. Calculation was then made for the cases where the Young's modulus of the bonding portion 13 was 0.1 MPa, 1 MPa, 10 MPa, and 100 MPa. A positional difference in the thickness direction between the center and an edge portion of the glass substrate 11 was regarded as the amount of warpage. Table 2 shows the Young's modulus (MPa) and the warpage (mm) in FIG. 5.

TABLE 2

| Young's modulus (MPa) | warpage (mm) |
|---|---|
| 0.1 | 0.000988 |
| 1 | 0.008057 |
| 10 | 0.024836 |
| 100 | 0.032134 |

Incidentally, when ΔH is calculated by use of formula (1) and formula (2), ΔH=0.04 mm. When ΔH is calculated by use of formula (2) and formula (3) on the assumption that the bonding portion 13 is sufficiently thin, ΔH=0.04 mm. It is understood that the amount of warpage can be reduced by selecting the Young's modulus of the material of the bonding portion 13. That is, with reference to the results shown in FIG. 5 and Table 2, it is understood that the amount of warpage is 0.033 mm or less in the case where the Young's modulus of the bonding portion 13 is less than 100 MPa. Accordingly, in the optical element according to an aspect of the present invention, the Young's modulus of the material of the bonding portion is less than 100 MPa.

In addition, the Young's modulus of the material of the bonding portion is preferably 20 MPa or less so that the amount of warpage is 0.03 mm or less. The Young's modulus of the material of the bonding portion is more preferably 10 MPa or less so that the amount of warpage is 0.025 mm or less. The Young's modulus of the material of the bonding portion is even more preferably 2 MPa or less so that the amount of warpage is 0.01 mm or less. The Young's modulus of the material of the bonding portion is particularly preferably 0.6 MPa or less so that the amount of warpage is 0.005 mm or less.

The aforementioned calculation was performed on the assumption that the Young's moduli or the linear thermal expansion coefficients were fixed values. However, the Young's moduli or the linear thermal expansion coefficients generally vary depending on temperature. Accordingly, not a value at the room temperature but an average value within a predetermined temperature range may be used as a value of Young's modulus or linear thermal expansion coefficient.

In addition, a resin material is typically softened at a higher temperature than a glass transition point thereof. Accordingly, the glass transition point of the material of the bonding portion 13 is preferably a temperature (for example, 85° C. or lower, or 50° C. or lower) which is not higher than the upper limit of an operating temperature range of the optical element 10 or an optical member where the optical element 10 is incorporated, or a temperature (for example, 25° C. or lower) which is close to the lower limit of the operating temperature range. In the case where the glass transition point is within the aforementioned temperature range, the bonding portion 13 is softened in at least a part of the operating temperature range so that the Young's modulus can decrease to relax the amount of warpage. Therefore, in the optical element according to an aspect of the present invention, the glass transition point of the bonding portion 13 is 85° C. or lower. The glass transition point of the bonding portion 13 is preferably 50° C. or lower, more preferably 25° C. or lower, and even more preferably 0° C. or lower.

A change in Young's modulus around a glass transition point is, for example, described in "Mechanical and thermal properties of graphite platelet/epoxy composites" Polymer 45 (2004) 8211-8219. The document describes behavior of a storage elastic modulus around a glass transition point (Tg). It can be considered that a Young's modulus behaves in the same manner. As described in the document, a Young's modulus typically exhibits a change of equal to or more than one order of magnitude around Tg. Accordingly, in the case where Tg is within the aforementioned temperature range, the Young's modulus of the bonding portion at a temperature equal to or less than Tg is preferably less than 100 MPa, and more preferably 20 MPa or less.

The glass transition point of the bonding portion can be measured by use of differential scanning calorimetry (DSC), differential thermal analysis (DTA) or the like. The measuring method is, for example, described in the following standards.

JIS K 7121: 2012 "Testing Methods for Transition Temperatures of Plastics"

JIS K 6240: 2011 "Rubber, Raw—Determination of the Glass Transition Temperature by Differential Scanning calorimetry (DSC)"

In addition, the amount of warpage increases as the width W of the bonding portion 13 increases. In consideration thereof, W is, for example, preferably 20 mm or less, and more preferably 10 mm or less. Further, the amount of warpage increases as the thickness of the glass substrate 11 decreases. Accordingly, the thickness of the glass substrate 11 is, for example, preferably set at 0.3 mm or less while the aforementioned width W is selected.

The aforementioned idea for reducing the warpage is also effective when the optical element 10 is, for example, bonded to another member such as a package or another optical member. For example, when the glass substrate 11 or the optical function portion 12 is bonded to a package member having a different linear thermal expansion coefficient from that of the glass substrate 11 or the optical function portion 12 to manufacture an optical unit, the warpage of the optical unit caused by a change in temperature can be reduced by use of a material having a low Young's modulus as a bonding agent. The Young's modulus of the bonding agent may be, for example, 2 MPa or less, or may be 0.6 MPa or less.

Optical System

Although the optical element according to an aspect of the present invention has been described above, the optical element according to the aspect can be applied (for example, incorporated) to various optical systems.

For example, such an optical system may include, in addition to the aforementioned optical element, a lens, an optical filter such as an antireflection filter or a band pass filter, a cover glass, a diaphragm, etc. cooperating with the optical element. However, those optical systems are exemplary, and an optical system to which the aforementioned optical element can be applied is not limited thereto.

Optical Device

In addition, it can be supposed to apply the aforementioned optical element or the aforementioned optical system to an imaging device such as a camera or to a measuring device to measure a distance or a shape by projecting light. That is, the optical element or the optical system according to an aspect of the present invention can be applied to an optical device including an imaging device, a measuring device, etc. However, those devices are exemplary, and application of the optical system to which the aforementioned optical element is applied is not limited thereto.

EXAMPLES

An aspect of the present invention will be specifically described below along the optical element 10 illustrated in FIG. 3B by way of example. The bonding portion 13 is rectangular in plan view and has a diagonal length (width) of 9 mm, by way of example. In addition, it is assumed that the glass substrate 11 is 0.2 mm thick, the bonding portion 13 is 0.01 mm thick, and the optical function portion 12 is 0.5 mm thick. As shown in FIG. 3B, the optical function portion 12 is a concave lens. It is assumed that the Young's modulus of the glass substrate 11 is 80,000 MPa, the linear thermal expansion coefficient of the glass substrate 11 is $1.3 \times 10^{-5}$/° C., the Young's modulus of the optical function portion 12 is 2,000 MPa, the linear thermal expansion coefficient of the optical function portion 12 is $1 \times 10^{-4}$/° C., the linear thermal expansion coefficient of the bonding portion 13 is $1 \times 10^{-4}$/° C., and the Young's modulus of the bonding portion 13 is 0.1 MPa. It is assumed that the glass transition point is 0° C.

When ΔH is calculated by use of formula (1) and formula (2), ΔH=0.04. In addition, when ΔH is calculated by use of formula (2) and formula (3), ΔH=0.04. In addition, the amount of warpage calculated by the finite element method in the case where the temperature changes by 25° C. is 1 μm. That is, it can be said that the amount of warpage is sufficiently small.

Although the present invention has been described in detail with reference to specified embodiments, it will be apparent to one skilled in the art that various changes and modifications can be made without departing from the intention and scope of the present invention. The present application is based on Japanese patent application No. 2018-153404 filed on Aug. 17, 2018, the whole contents of which are incorporated herein by reference.

REFERENCE SIGNS LIST 10 optical element
11 glass substrate
12 optical function portion
13 bonding portion
14 space

The invention claimed is:
1. An optical element comprising:
a glass substrate;
an optical function portion made of a resin and having a lens function; and
a bonding portion that bonds the glass substrate and the optical function portion to each other, wherein the bonding portion has a glass transition point of 85° C. or lower, and wherein a displacement ΔH defined by the following formula is 0.005 mm or more in a case of ΔT=25° C.:

$$\Delta H=(1/|K|)-\sqrt{\{(1/K)^2-(W/2)^2\}},$$

where $$K=(A\times F-B\times D)/(A\times C-B^2),$$

$$A=Es\times Hs+Em\times Hm,$$

$$B=(\tfrac{1}{2})\times[Es\times Hs^2+Em\times\{(Hs+Hm)^2-Hs^2\}],$$

$$C=(\tfrac{1}{3})\times[Es\times Hs^3+Em\times\{(Hs+Hm)^3-Hs^3\}],$$

$$D=\Delta Tx\{Es\times\alpha s\times Hs\ Em\times\alpha m\times Hm\},$$

$$F=(\Delta T/2)\times[Es\times\alpha s\times Hs^2+Em\times\alpha m\times\{(Hs+Hm)^2-Hs^2\}]),$$
and Hm designates a thickness of a thickest part of the optical function portion, Ern designates a Young's modulus of the optical function portion, αm designates a linear thermal expansion coefficient of the optical function portion, Hs designates a thickness of the glass substrate, Es designates a Young's modulus of the glass substrate, αs designates a linear thermal expansion coefficient of the glass substrate, W designates a width of the bonding portion, and ΔT designates a difference between a room temperature and an upper limit of a temperature range where the optical element should function.

2. The optical element according to claim 1, wherein the glass transition point of the bonding portion is 50° C. or lower.

3. The optical element according to claim 2, wherein the glass transition point of the bonding portion is 25° C. or lower.

4. The optical element according to claim 1, wherein the bonding portion has a Young's modulus of less than 100 MPa.

5. The optical element according to claim 1, wherein the ΔH in a case of ΔT=25° C. is 0.01 mm or more.

6. An optical system comprising the optical element according to claim 1.

7. An optical device comprising the optical element according to claim 1.

8. The optical element according to claim 1, wherein the glass substrate has an optical filter function.

9. The optical element according to claim 1, wherein the glass substrate has a width smaller than a width of the optical function portion.

10. The optical element according to claim 1, wherein the bonding portion comprises an Optical Clear Adhesive (OCA) double-sided tape.

11. The optical element according to claim 1, wherein the glass substrate has a rectangular shape in plan view.

12. An optical element comprising:
a glass substrate;
an optical function portion made of a resin and having a lens function; and
a bonding portion that bonds the glass substrate and the optical function portion to each other, wherein the bonding portion has a Young's modulus of less than 100 MPa, and wherein a displacement ΔH defined by the following formula is 0.005 mm or more in a case of ΔT=25° C.:

$$\Delta H=(1/|K|)-\sqrt{\{(1/K)^2-(W/2)^2\}},$$

where $$K=(A\times F-B\times D)/(A\times C-B^2),$$

$$A=Es\times Hs+Em\times Hm,$$

$$B=(\tfrac{1}{2})\times[Es\times Hs^2+Em\times\{(Hs+Hm)^2-Hs^2\}],$$

$$C=(\tfrac{1}{3})\times[Es/Hs^3+Em\times\{(Hs+Hm)^3-Hs^3\}],$$

$$D=\Delta Tx\{Es\times\alpha s\times Hs+Em\times\alpha m\times Hm\},$$

$$F=(\Delta T/2)\times[Es\times\alpha s\times Hs^2+Em\times\alpha m\times\{(Hs+Hm)^2-Hs^2\}]),$$
and Hm designates a thickness of a thickest part of the optical function portion, Em designates a Young's modulus of the optical function portion, αm designates a linear thermal expansion coefficient of the optical function portion, Hs designates a thickness of the glass substrate, Es designates a Young's modulus of the glass substrate, αs designates a linear thermal expansion coefficient of the glass substrate, W designates a width of the bonding portion, and ΔT designates a difference between a room temperature and an upper limit of a temperature range where the optical element should function.

13. The optical element according to claim 12, wherein the Young's modulus of the bonding portion is 20 MPa or less.

14. The optical element according to claim 12, wherein the ΔH in a case of ΔT=25° C. is 0.01 mm or more.

15. An optical system comprising the optical element according to claim 12.

16. An optical device comprising the optical element according to claim 12.

17. The optical element according to claim 12, wherein the glass substrate has an optical filter function.

18. The optical element according to claim 12, wherein the glass substrate has a width smaller than a width of the optical function portion.

19. The optical element according to claim 12, wherein the bonding portion comprises an Optical Clear Adhesive (OCA) double-sided tape.

20. The optical element according to claim 12, wherein the glass substrate has a rectangular shape in plan view.

* * * * *